(12) United States Patent
Popovski et al.

(10) Patent No.: US 8,051,050 B2
(45) Date of Patent: Nov. 1, 2011

(54) BLOCK-LEVEL DATA DE-DUPLICATION USING THINLY PROVISIONED DATA STORAGE VOLUMES

(75) Inventors: Vladimir Popovski, Irvine, CA (US); Nelson Nahum, Tustin, CA (US)

(73) Assignee: LSI Corporation, Milpitas, CA (US)

( * ) Notice: Subject to any disclaimer, the term of this patent is extended or adjusted under 35 U.S.C. 154(b) by 281 days.

(21) Appl. No.: 12/504,426

(22) Filed: Jul. 16, 2009

(65) Prior Publication Data

US 2011/0016152 A1   Jan. 20, 2011

(51) Int. Cl.
*G06F 7/00* (2006.01)
*G06F 17/00* (2006.01)
*G06F 17/30* (2006.01)

(52) U.S. Cl. ........ 707/692; 707/812; 707/821; 707/797; 711/114; 711/118

(58) Field of Classification Search .................. None
See application file for complete search history.

(56) References Cited

U.S. PATENT DOCUMENTS

| | | | |
|---|---|---|---|
| 7,962,706 B2 * | 6/2011 | Davis | 711/158 |
| 2008/0155192 A1 * | 6/2008 | Iitsuka | 711/114 |
| 2011/0004639 A1 * | 1/2011 | Williams | 707/812 |

* cited by examiner

*Primary Examiner* — Kuen Lu
*Assistant Examiner* — Loan T Nguyen
(74) *Attorney, Agent, or Firm* — Daniel J. Santos; Lawrence D. Maxwell

(57) ABSTRACT

Data segments are logically organized in groups in a data repository. Each segment is stored at an index in the data repository. In association with a write request, a hash algorithm is applied to the data segment to generate a group identifier. Each group is identifiable by a corresponding group identifier. The group identifier is applied to a hash tree to determine whether a corresponding group in the data repository exists. Each existing group in the data repository corresponds to a leaf of the hash tree. If no corresponding group exists in the data repository, the data segment is stored in a new group in the data repository. However, if a corresponding group exists, the group is further searched to determine if a data segment matching the data segment to be stored is already stored. The data segment can be stored in accordance with the results of the search.

15 Claims, 8 Drawing Sheets

US 8,051,050 B2

BLOCK-LEVEL DATA DE-DUPLICATION USING THINLY PROVISIONED DATA STORAGE VOLUMES

TECHNICAL FIELD OF THE INVENTION

The invention relates to data de-duplication in data storage systems.

BACKGROUND OF THE INVENTION

Storing redundant data can be inefficient. Although some forms of data storage redundancy, such as RAID (redundant arrays of inexpensive disks), in which the redundancy promotes reliability, can be useful, other forms of data storage redundancy can be wasteful and an inefficient use of storage resources. For example, in some computer systems, multiple hosts or processes frequently access the same data in the same storage system. Absent any measures to the contrary, each host or process causes the storage system to store the data in a location (e.g., an area on a disk) independently of any other host that may cause the storage system to store the same data in another location (e.g., another area on the disk or another disk).

Data de-duplication is a term that is commonly used to describe methods for reducing undesirable data storage redundancy. Data de-duplication can be employed in various computing system environments, and is especially useful in an environment in which data is backed up to a secondary storage system, as backed-up data typically comprises a large amount of redundant data, i.e., data that is duplicative of data that has been previously backed up. Networked e-mail is another environment in which data-de-duplication may be useful, as multiple users commonly have access to copies or duplicates of the same e-mail message.

Data de-duplication can be performed either in real-time, as the data is received for storage (i.e., "in-line"), or after the data has been stored (i.e., "post-processing"). Data de-duplication can be performed at the source, i.e., the host or filesystem that requires access to the data, or at the destination, i.e., the data storage system. Data de-duplication can be performed on a per-file basis or on blocks into which the data has been partitioned. In block-level de-duplication, the blocks can be of fixed size or variable size. Each of these data de-duplication parameters has advantages and disadvantages.

Data de-duplication methods fall into one of two main categories: hash-based or byte-level delta. Hash-based data de-duplication involves partitioning the data into blocks or segments and applying a cryptographic algorithm (colloquially referred to as a "hash" algorithm) to each data segment to produce a hash code or identifier that identifies the segment. Multiple references to this hash code can be stored to accommodate the multiple instances in which various hosts or processes reference the data identified by the hash code, but only a single copy of the data segment itself is stored. Efficiency is achieved because less storage area is required to store the hash codes and multiple references thereto than to store multiple copies of the data itself. Hash-based data de-duplication is commonly performed in-line, i.e., as data is received for storage. As each segment is received, it can be determined whether it is duplicative of data already in storage by applying the hash algorithm and comparing the hash code to those that have been stored. A strong hash algorithm minimizes the likelihood of collision, i.e., that two different data segments will yield the same hash code. However, a strong hash algorithm can inefficiently consume computation (i.e., central processing unit or CPU) resources. Also, providing a unique hash code for every unique data segment requires storage and retrieval of a large number of hash codes and references thereto, thereby inefficiently consuming storage resources. Each hash code itself must be large (i.e., many bytes long) to uniquely identify each unique data segment.

Byte-level delta data de-duplication involves comparing multiple versions of data over time and storing only the byte-level differences (i.e., delta) that occur between versions. Byte-level delta data de-duplication is commonly performed as post-processing, i.e., after the data has been stored on disk. While byte-level data de-duplication does not generally tax computation or storage resources, it can be very slow if large amounts of data must be compared.

SUMMARY

The invention relates to data de-duplication in a data storage system having a data repository in which data segments are logically organized in groups. Each segment is stored at an index in the data repository. When a data segment is provided in association with a write request, a hash algorithm is applied to the data segment to generate a group identifier. Each group is identifiable by a corresponding group identifier. The group identifier is then applied to a hash tree to determine whether a corresponding group in the data repository exists. Each existing group in the data repository corresponds to a leaf of the hash tree. If no group corresponding to the generated group identifier is determined to exist in the data repository, the data segment is stored in a new group in the data repository. However, if a group corresponding to the generated group identifier is determined to exist in the data repository, the corresponding group is further searched to determine if a data segment matching the data segment to be stored is already stored. The data segment can then be stored in accordance with the results of the search of the group.

DETAILED DESCRIPTION OF AN ILLUSTRATIVE EMBODIMENT

Figure 1:
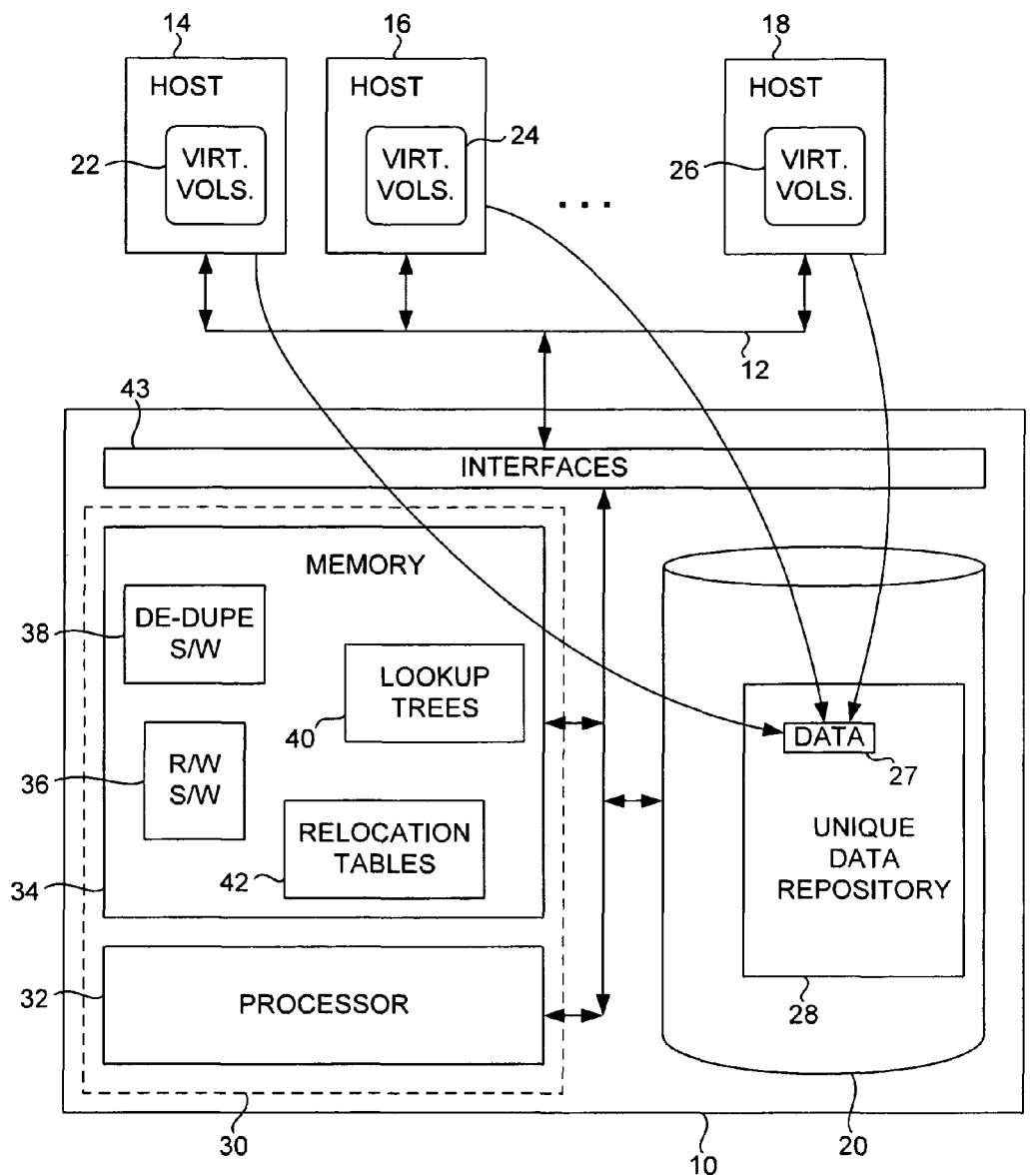
FIG. 1 is a block diagram of a data storage system having a data de-duplication feature, in accordance with an exemplary embodiment of the invention.

As illustrated in FIG. 1, in an illustrative or exemplary embodiment of the invention, a data storage system 10 communicates via a data network 12 with a number of hosts (computer systems) 14, 16, 18, etc. Although in the exemplary embodiment hosts 14, 16, 18, etc., are described for purposes of clarity of illustration as separate systems, e.g., in physically distinct computers, in other embodiments they can be virtual hosts that share a computer system with each other or with other elements. Data storage system 10 can be, for example, a fileserver or other network server, a RAID (redundant array of inexpensive disks), SAN (storage area network) system, or any other system in which data can be stored in and retrieved from one or more persistent storage devices, such as disks 20. Only the elements of data storage system 10 that are relevant to the exemplary embodiment of the invention are illustrated, and elements relating to other functions, such as file or database management, mirroring, etc., are not shown for purposes of clarity. Although the persistent storage devices can include any number of devices of any suitable storage media type, arranged and connected with each other and other elements of data storage 10 in any suitable manner, they are referred to herein as disks 20 for purposes of clarity of illustration.

Each of hosts 14, 16, 18, etc., can initiate read and write operations, i.e., requests, on data storage system 10. A read operation can include information identifying a logical volume address and the number of bytes to be read beginning at that address. In response to a read operation, data storage system 10 reads the data from disks 20 and returns it to the requesting host. A write operation can include data and the logical volume address to which the data is to be written. In response to some write operations, data storage system 10 writes the data to disks 20 and returns to the requesting host an indication that the write operation was completed. Logical or virtual volumes 22, 24, 26, etc., are the means by which a host (or a process running on the host) keeps track of stored data. Logical or virtual volume addresses need not correspond to storage locations on disks 20 or other persistent storage at which data is physically recorded. For example, storage system 10 may operate upon an address space in disks 20 (e.g., organized as (physical) volumes) that is much smaller than the virtual address space upon which a host 14, 16, 18, etc., operates. Indeed, as described in further detail below, little or no virtual address space need be allocated to virtual volumes 22, 24, 26, etc., as their address space or virtual capacity can be expanded dynamically as new data is stored. The effect of the potentially much smaller size of the physical address space of disks 20 than the virtual address space used by hosts 14, 16, etc., and the dynamic address space allocation can be referred to as "thin provisioning" of disks 20. From the host's perspective, the data is stored on the virtual volume, i.e., in the virtual address space, even though the data is physically stored on disks 20 (or physical volumes into which the storage space of disks 20 may be organized).

As conceptually illustrated by the arcuate arrows in FIG. 1 between some exemplary "data" 27 and the hosts 14, 16, 18, etc., more than one host or process may access, i.e., store and retrieve, the same data. As described herein with regard to the exemplary embodiment, the present invention inhibits duplication of such data and promotes storage of only a single, unique instance of such data while maintaining different logical references to the data for each host or process that accesses the data. In the exemplary embodiment, a unique data repository 28 is created in disks 20 or physical volumes representing the storage space on disks 20. Unique data repository 28, which is a logical structure or data structure, is described in further detail below.

Before data storage system 10 is used, i.e., before receiving a read request or write request from hosts 14, 16, 18, etc., data storage system 10 is initialized. When data storage system 10 receives an indication to perform initialization, it can allocate storage space in disks 20 or other persistent storage for storing metadata that represents virtual volumes 22, 24, 26, etc. As noted above, little storage space is needed for such metadata, as the address space or virtual capacity of virtual volumes 22, 24, 26, etc., can be expanded dynamically as new data is stored. It should be noted that no storage space at all need be allocated in disks 20 or other persistent storage for the data (i.e., data segments) itself, as such storage space can likewise be allocated dynamically in unique data repository 28 as new data is stored.

Although storage system 10 can have any suitable structure or architecture that enables it to control or otherwise effect the functions described herein, FIG. 1 illustrates an exemplary structure in which the functions are performed at least in part under the control of software elements. The combination of such software or firmware elements and the hardware elements with which they interact constitutes a programmed processor system 30 that is programmed or configured to effect the functions or methods of operation described herein. Programmed processor system 30 includes at least a processor 32 or similar device and some suitable memory 34. Although memory 34 is shown for purposes of clarity as a single or unitary element, it should be understood that memory 34 can include memory devices of any suitable type and number, including, for example, non-volatile memory such as FLASH memory, (volatile) random-access memory, etc. Similarly, processor 32 can include one or more devices.

Programmed processor system 30 can effect the writing of data to and reading of data from disks 20 under control of a read/write software element 36. Programmed processor system 30 can also effect the data de-duplication methods described below under control of a de-duplication software element 38. Additional software elements, including lookup trees 40 and relocation tables 42 are also described below with regard to the data de-duplication methods. These software elements are shown as separate and distinct for purposes of illustration but can be organized in any suitable manner, including being combined with each other or with other elements, divided into additional elements, etc. Storage system 10 can further include various suitable interfaces 43 that aid interfacing it with hosts 14, 16, 18, etc.

Also, although the above-described software elements are depicted for purposes of illustration as stored in or residing in memory 34, as persons skilled in the art to which the invention relates understand, such software elements may not reside simultaneously or in their entireties in memory 34 or other such storage medium. Rather, in accordance with conventional computing principles, such software elements can be retrieved into memory 34 in portions (e.g., instructions, code segments, files, libraries, etc.) on an as-needed basis from one or more suitable sources, such as disks 20 or other storage devices, via network 12 from a remote device, etc. Much of lookup trees 40 and relocation tables 42, for example, can remain stored on disks 20, while only the portions of them that are needed at any given time are cached in memory 34. It should be noted that the combination of one or more of above-described software elements or portions thereof and memory 34, disks 20 or other computer-readable medium on which they are recorded constitutes a "computer program product" as that term is used in the patent lexicon.

Furthermore, although in the exemplary embodiment the data storage devices (disks 20) are shown as residing within data storage system 10, in other embodiments the data storage devices can be separate from the elements that perform the functions ascribed to programmed processor system 30 in the exemplary embodiment. That is, such data storage devices can be separate from, i.e., external to, storage system 10. Similarly, although in the exemplary embodiment data network 12 provides communication between hosts 14, 16, 18, etc., and storage system 10, in other embodiments such communication can occur through any suitable physical or logical communication channels between any physical or logical hosts and the elements that perform the functions ascribed to programmed processor system 30 in the exemplary embodiment. For example, such communication can occur entirely or primarily within a single computer, without any external data network. In still other embodiments, some or all of the functions ascribed herein to programmed processor system 30 can be performed by one or more of the hosts themselves.

Figure 2:
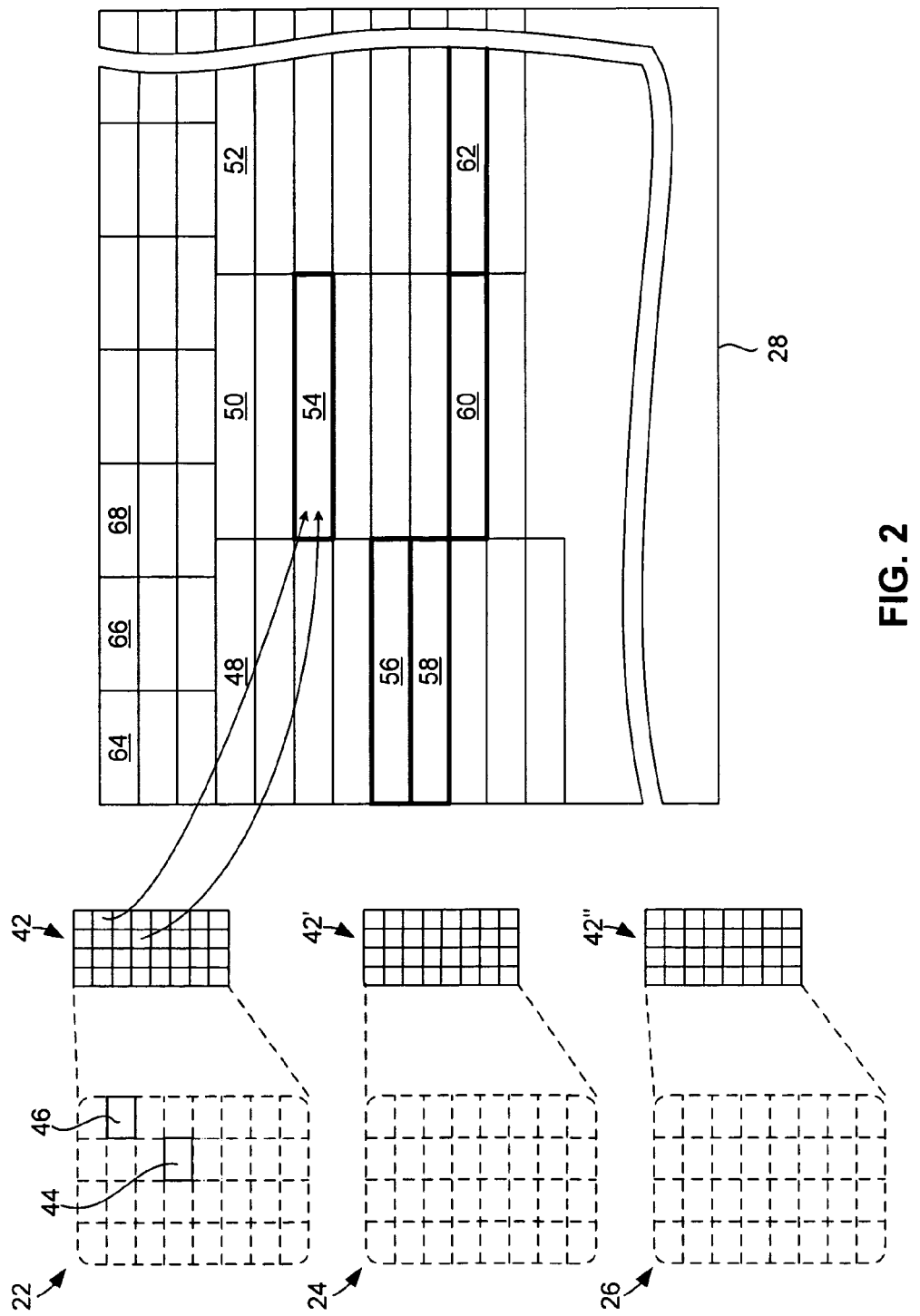
FIG. 2 illustrates a data repository, relocation tables, and virtual volumes, in accordance with the exemplary embodiment.

As illustrated in FIG. 2, each of two virtual volume addresses 44 and 46 in, for example, virtual volume 22 corresponds to an element in one of relocation tables 42. In writing data to storage system 10 or reading data from storage system 10, a host includes such a virtual volume address as part of or otherwise in association with the read or write request. Relocation tables 42 can comprise any number of individual tables or similar structures, but for purposes of illustration each of virtual volumes 22, 24, 26, etc., is shown in FIG. 2 as corresponding to one of tables 42.

Each of the exemplary indexes 48, 50, 52, 54, 56, 58, 60, 62, etc., shown in data repository 28 indicates a storage location in which a data segment is stored. In the exemplary embodiment all data segments have the same length. Elements of relocation table 42 point to or indicate corresponding addresses or locations (referred to herein as indexes) in data repository 28. For example, an index can be in a form that allows it to be converted into an address in data repository 28. Note in the example illustrated in FIG. 2 that two elements of one of relocation tables 42 can indicate or correspond to the same index 54 (and, accordingly, also indicate or correspond to the same data segment stored at index 54). A relocation table 42 can be used to determine an index in the data repository in response to a virtual volume address. For example, in response to virtual volume address 44 associated with a read request, it can be determined from a relocation table 42 that data is to be read from index 54 in data repository 28. Likewise, in response to virtual volume address 46 associated with a read request, it can be determined from relocation table 42 that data is to be read from index 54 in data repository 28. It should be noted that although for purposes of illustration in the exemplary embodiment each of virtual volumes 22, 24, 26, etc., is associated with a different one of hosts 14, 16, 18, etc., a single host or process can access any number of virtual volumes.

Each segment (and, accordingly, each index at which a segment is stored) has a corresponding reference counter 64, 66, 68, etc. As described in further detail below, a reference counter maintains a count of the number of instances in which the corresponding segment is referenced in a relocation table 42. For example, a reference counter corresponding to the segment stored at index 54 can have a value of two, indicating that it is referenced by two elements in that relocation table 42, corresponding to virtual addresses 44 and 46. Although in the exemplary embodiment the locations of reference counters 64, 66, 68, etc., are shown for purposes of illustration in one area of data repository 28 and exemplary indexes 48, 50, 52, 54, 56, 58, 60, 62, etc., in another area of data repository 28, data repository 28 can be organized in any other suitable manner. Furthermore, although data repository 28 is shown as a unitary element in FIG. 2 for purposes of illustration, reference counters, data segments and other elements can be distributed among any number and type of storage structures or devices.

As further illustrated in FIG. 2, data segments are stored in groups in data repository 28. For example, a group can include (data segments stored at) indexes 54, 56, 58, 60 and 62, highlighted in bold line in FIG. 2. A group identifier (e.g., a number), is assigned to each group as the group is created in order to identify the group. A group identifier is generated in response to a data segment and a hash algorithm. That is, the data segment is input to a hash algorithm, which produces a hash code or key, referred to herein as a group identifier because in the context of the present invention it is used to identify the groups. There can be any number of groups, depending upon the selected size of the group identifier. For example, for a 32-bit group identifier, there can be up to $2^{32}$ groups. Any suitable hash algorithm can be used, such as, for example, that which is commonly known as CRC32, or a combination of CRC32 and that which is commonly known as S-Box (substitution box). Using a hash algorithm to generate a group identifier, it can quickly and efficiently be determined to which of a number of groups a segment belongs. The group identifier can be relatively short in comparison with hash keys used in some prior hash-based de-duplication methods, because the group identifier need not uniquely identify every unique data segment that is stored in data repository 28; rather, it need only identify groups of data segments, where each group can include a number of data segments (or indexes to data segment storage locations).

Figure 3:
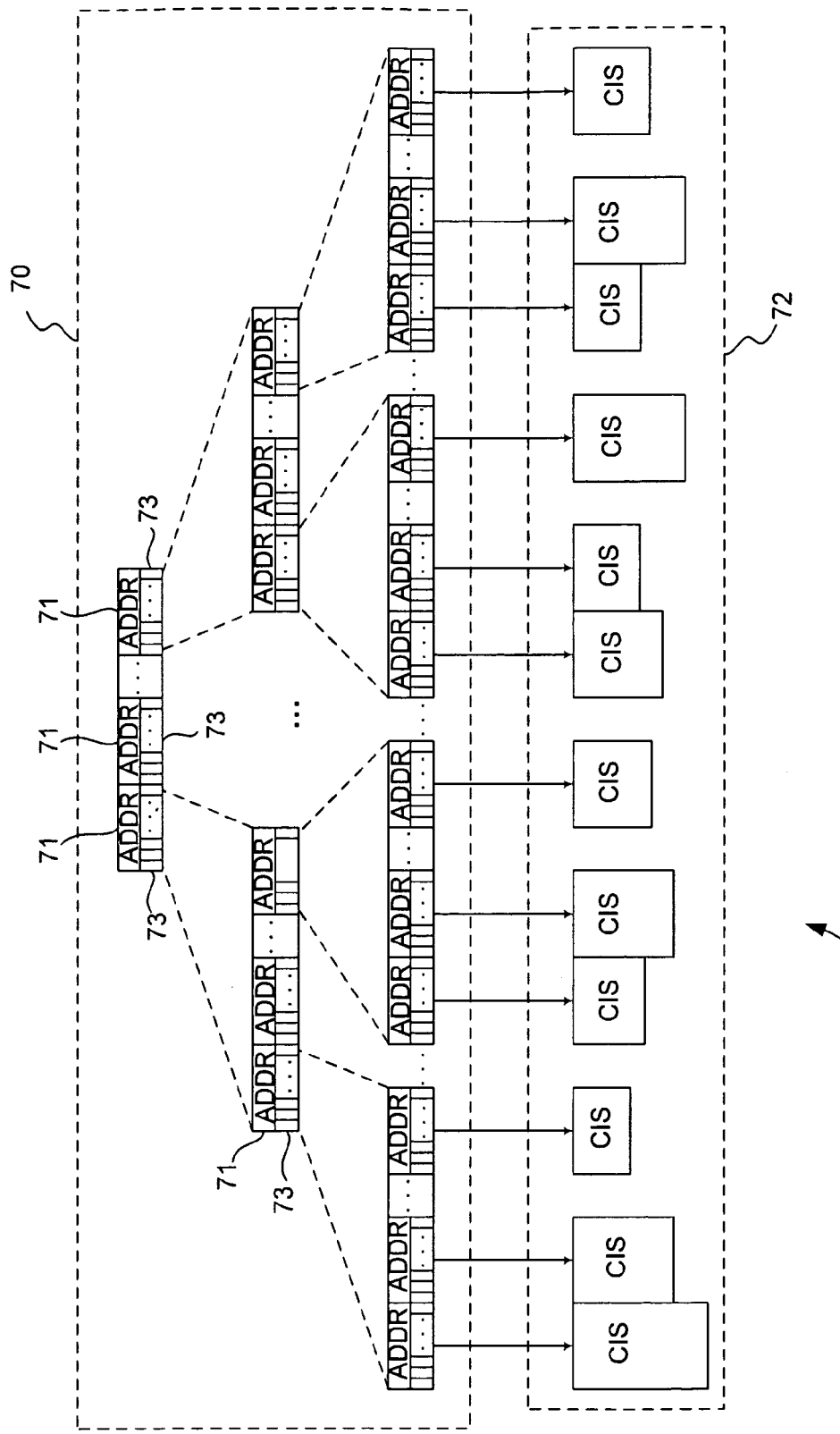
FIG. 3 illustrates a hash tree and associated collision trees.

As illustrated in FIG. 3, lookup trees 40 include a hash tree 70 and collision indicating structures 72, which can also have a tree format. Hash tree 70 can be a prefix B-tree. Each node of the tree contains the base address 71 of the branches underlying that node, and a bit mask table 73 for each branch. The bit mask table 73 indicates (e.g., with a stored "1" or "0") whether a branch or sub-node exists below that node. Although hash tree 70 can have any suitable structure and size, in the exemplary embodiment it has three levels, each with 256 sub-nodes, and with the lowest level having leaves associated with collision indicating structures (CIS) 72. Likewise, each bit mask table 73 has 256 bits. As described below, using such a hash tree 70, a group can be identified by a 32-bit (i.e., 4-byte) group identifier.

Figure 4:
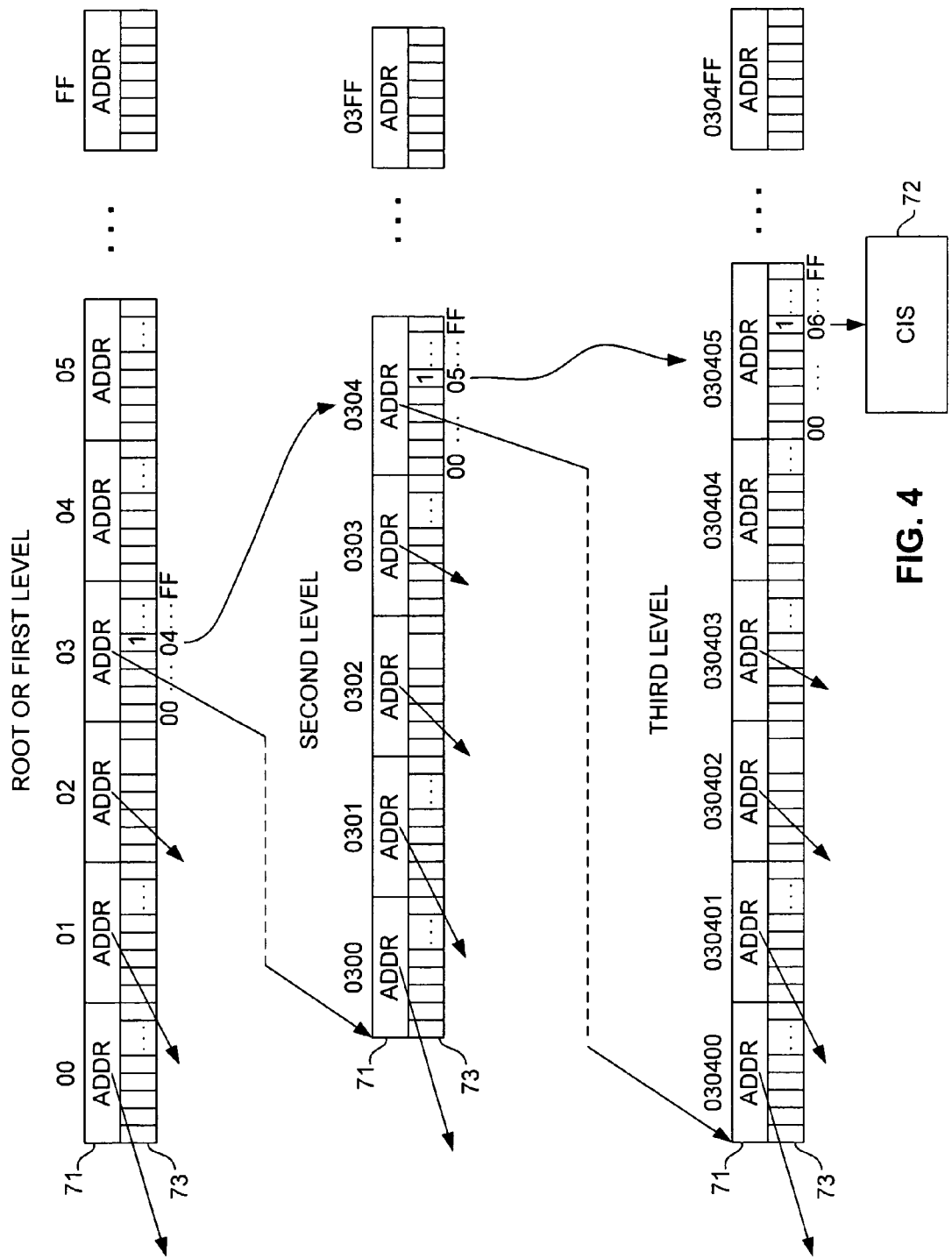
FIG. 4 illustrates an example of using a hash tree.

It can be determined whether a group corresponding to a group identifier exists in data repository 28 (and thus whether a corresponding CIS 72 exists) by inputting or applying the group identifier to hash tree 70. An example is illustrated in FIG. 4, using a group identifier represented in hexadecimal notation as 0x03040506. The first (most significant) two bytes of this exemplary group identifier indicate that bit 04 of the bitmask of sub-element 03 (of the first or root level element) is to be examined. In this example, that bit has been set to 1, which indicates that a sub-element exists on the next level. (The values of other bits are not shown for purposes of clarity.) If that bit had been set to 0, it would indicate that there is no CIS 72 to be found. The address, ADDR, points to the address of the element that exists on the next level. The next byte, 05, indicates that bit 05 of the bitmask of sub-element 0304 is to be examined. In this example, that bit has been set to 1, which indicates that an element exists on the next level. If that bit had been set to 0, it would indicate that there is no CIS 72 to be found. The address, ADDR, points to the address of the element that exists on the next level. The next byte, 06, indicates that bit 06 of the bitmask of sub-element 030405 is to be examined. In this example, that bit has been set to 1, which indicates that an element exists on the next level. As hash tree 70 in the exemplary embodiment has only three levels, the element that exists on the next level is the CIS 72. That is, the leaves of hash tree 70 are at the third level. Each leaf is associated with or corresponds to a CIS 72. Each leaf is thus also associated with or corresponds to a group. Thus, using hash tree 70, a group can be identified in response to a group identifier.

Figure 5:
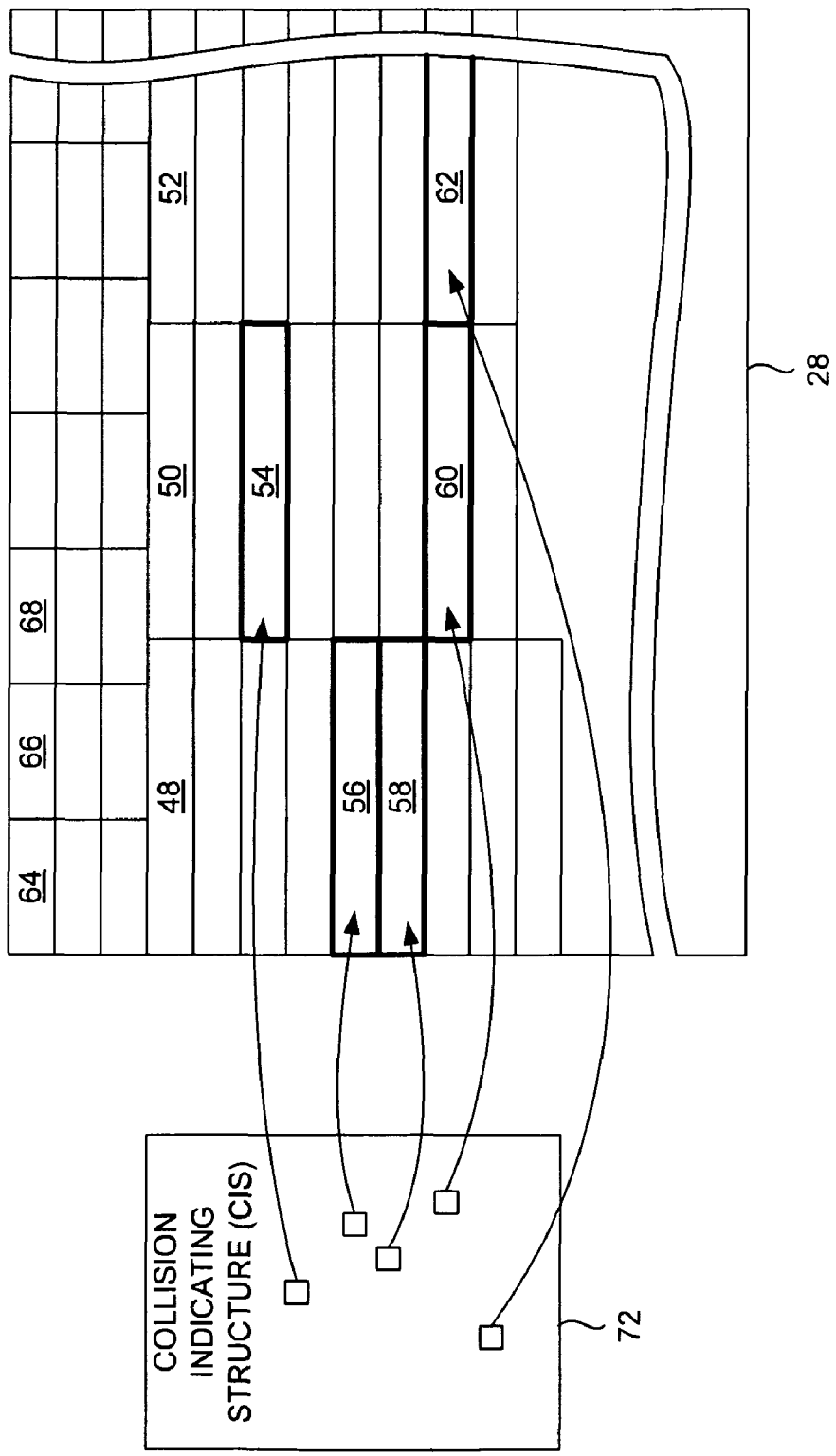
FIG. 5 illustrates relationships between collision tree elements and data repository indexes.

As indicated in FIGS. 3 and 5, each group that is represented in data repository 28 has a CIS 72 associated with a leaf of hash tree 70 corresponding to that group. With reference to FIG. 5, a CIS 72 can be used within the group to determine an index at which a particular data segment is stored. CIS 72 can be any suitable type of data structure, such as a "sub-hash tree" similar to hash tree 70, a tree representing bit-wise similarities between data segments, i.e., elements in the tree, a table, or any other suitable structure. As conceptually illustrated in FIG. 5, elements, such as leaves, of CIS 72 point to or correspond to segments (or their indexes) in data repository 28. For example, in an embodiment in which the collision indicating structure is a tree, leaves of the tree can hold indexes of data segments in data repository 28.

Figure 6:
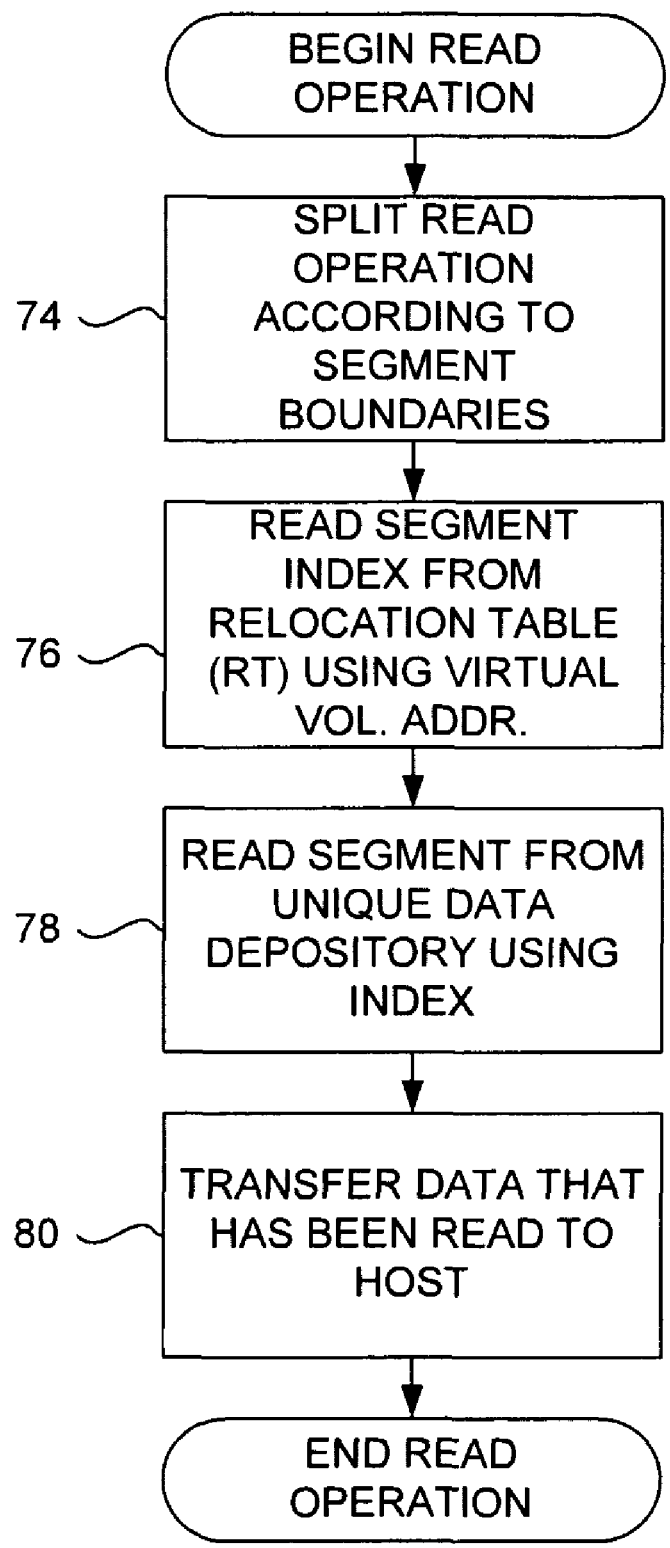
FIG. 6 is a flow diagram, illustrating a method relating to data de-duplication in connection with a read operation, in accordance with the exemplary embodiment.

As illustrated in FIG. 6, data de-duplication methods for data storage system 10 can include methods associated with a read request, i.e., a read operation, from, for example, any of hosts 14, 16, 18, etc. (FIG. 1). As described above, such methods can be effected under the control of programmed processor system 30 (FIG. 1) in accordance with software elements such as de-duplication software 38 and read/write software 36. In view of the descriptions herein of such operations, persons of skill in the art to which the invention relates will readily be capable of creating or otherwise providing suitable software and other elements.

When a read operation is requested, indicating a virtual volume address to be read and a number of bytes to be read beginning at that address, the read operation is first split or segmented, such that the read operation can be related to a requisite number of segments (rather than bytes) to be read, as indicated by block 74 in FIG. 6. The following description applies to each segment. The index at which the requested segment is stored in data repository 28 is obtained from relocation table 42 in response to the virtual volume address, as indicated by block 76. The segment can then be read from data repository 28 in response to that index, as indicated by block 78. Once the segment has been read, it can be returned to the requesting host, as indicated by block 80.

Figure 7A:
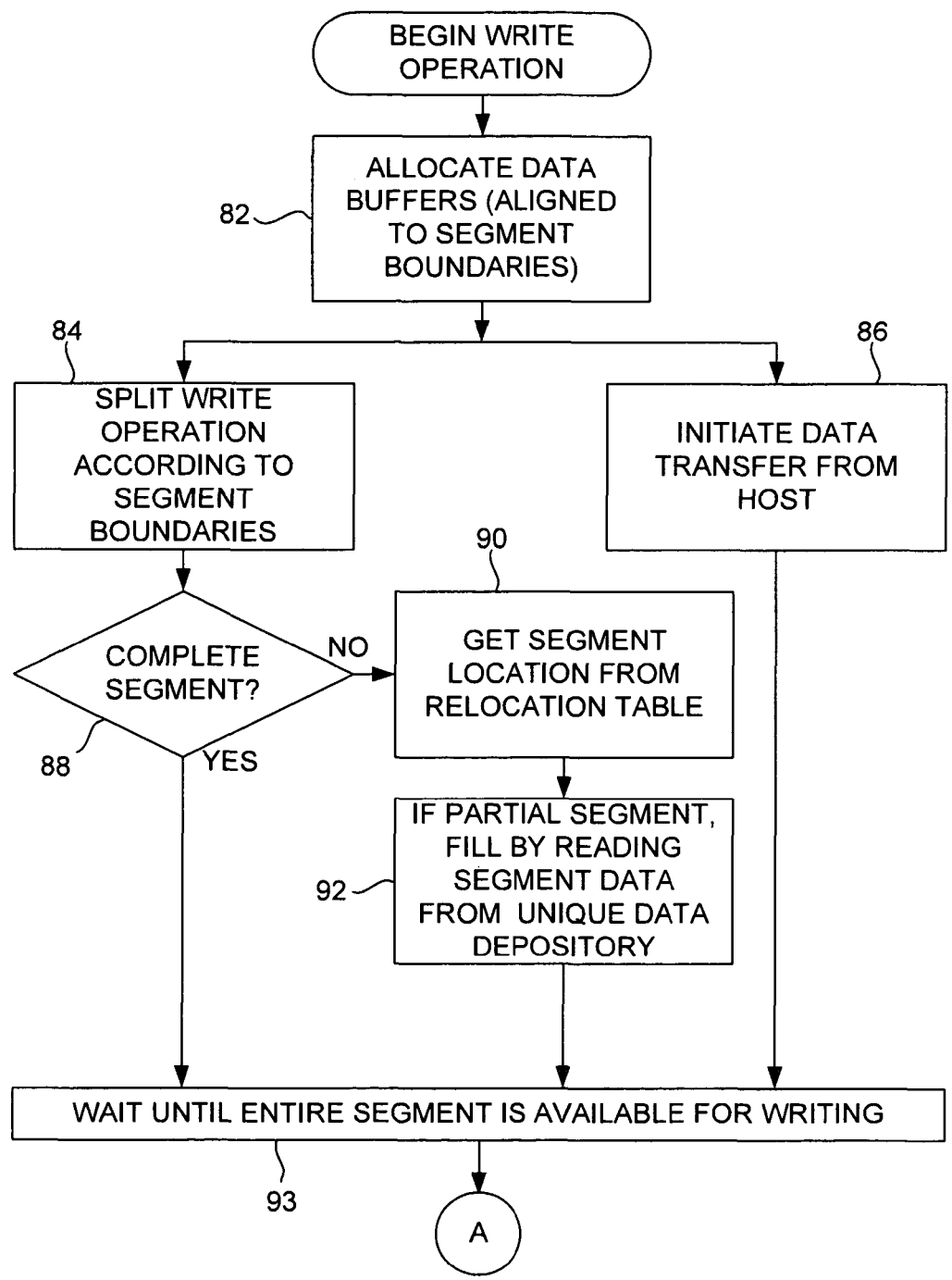
FIG. 7A is a flow diagram, illustrating a method relating to data de-duplication in connection with a write operation, in accordance with the exemplary embodiment.
Figure 7B:
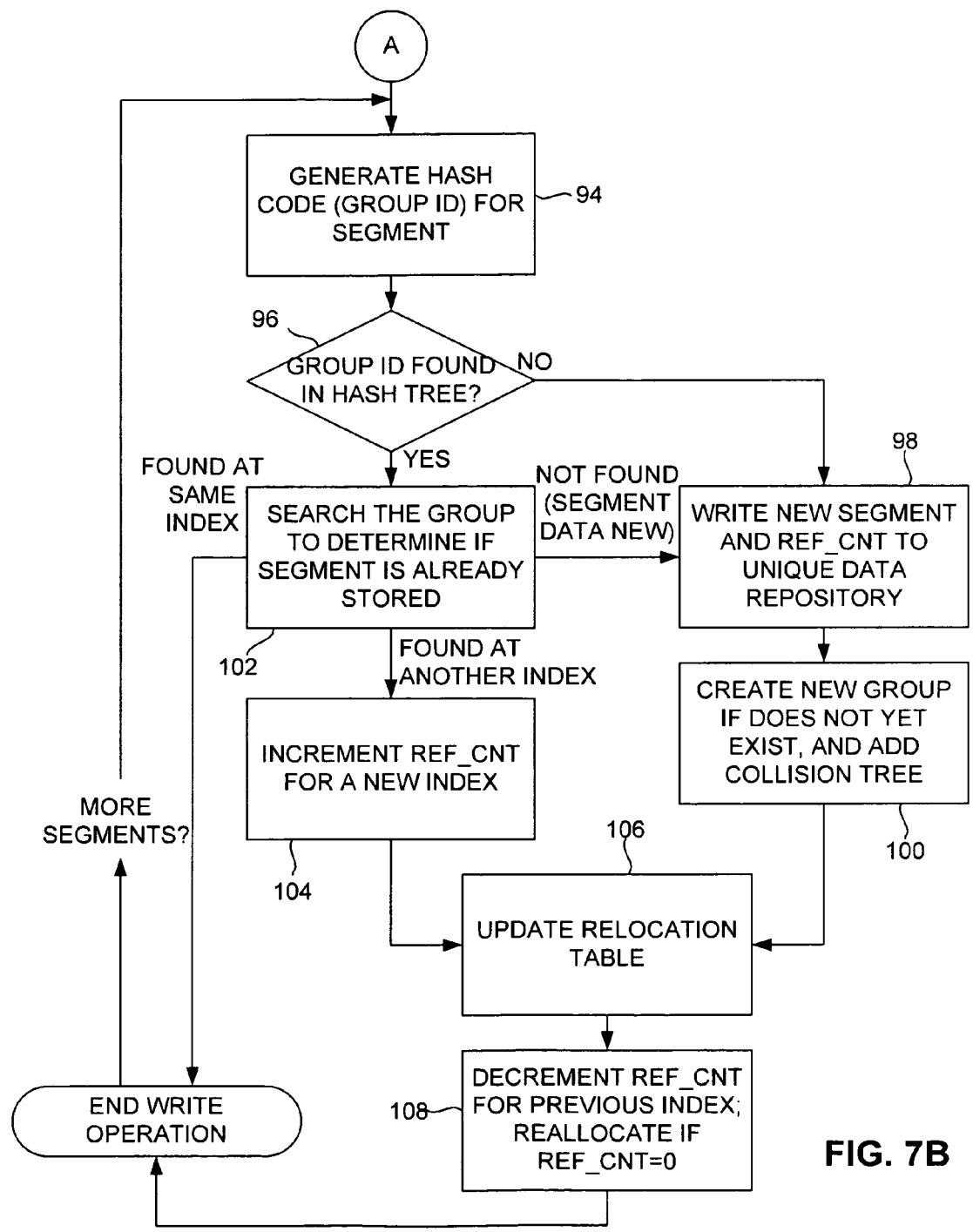
FIG. 7B is a continuation of the flow diagram of FIG. 6A.

As illustrated in FIGS. 7A-B, data de-duplication methods for data storage system 10 can also include methods associated with a write request, i.e., a write operation, from, for example, any of hosts 14, 16, 18, etc. (FIG. 1). As described above, such methods can be effected under the control of programmed processor system 30 (FIG. 1) in accordance with software elements such as de-duplication software 38 and read/write software 36.

When a write operation is requested, data to be stored is provided (e.g., by the requesting host), along with a virtual volume address to which the data is to be written. As indicated by block 82, sufficient buffer space can first be allocated to accommodate the number of data segments corresponding to the data to be stored. The write operation can be split according to segment boundaries, such that each segment can be written in turn, as indicated by block 84. In parallel with the operations indicated by block 84 (or at such other time as may be appropriate), the data to be written is received from the requesting host, as indicated by block 86. Data storage system 10 can initiate this transfer in response to the write request, or the data can be transferred in any other suitable manner. The write operation does not proceed until an amount of data is received that is sufficient to fill a (buffer) segment. If, as indicated by block 88, the segment is not complete, i.e., the data requested to be written does not fill an entire segment, then the index of the partial segment is obtained from relocation table 42 in response to the corresponding virtual volume address, as indicated by block 90, and the data segment at that index is read from data repository 28 and used to fill the remainder of the buffer, as indicated by block 92. The following description, with reference to FIG. 7B, applies to each data segment that is ready to be written, as indicated by block 93.

As indicated by block 94, a group identifier is generated by applying the hash algorithm to the data segment. As indicated by block 96, it is then determined whether a group corresponding to that group identifier exists in data repository 28 by applying the group identifier to hash tree 70. As described above, for each existing group, hash tree 70 has a leaf with which one of collision trees 72 is associated.

If no group corresponding to the generated group identifier exists in data repository 28, then the segment is written to, i.e., stored in, data repository 28, as indicated by block 98. The segment is part of a new group. The segment can be written in any suitable manner and in any suitable storage location, such as a storage location corresponding to the next available index (in numerical sequence). An allocation manager (not separately shown) can be included in de-duplication software 38 to provide such an index, keep track of used and free indexes (i.e., storage spaces), and to provide other functions relating to storage space allocation. A reference counter corresponding to the index at which the data segment is written is also added to data repository 28. An indication that the new group exists is added to hash tree 70 at the leaf corresponding to the generated group identifier, as indicated by block 100. A collision tree, which may serve as the indication, is also added to that leaf of hash tree 70, as further indicated by block 100.

If a group corresponding to the generated group identifier already exists in data repository 28, then the corresponding group in data repository 28 is searched to determined if the segment data already exists in the group, as indicated by block 102. The search can be performed in any suitable manner, such as by generating an additional hash code for each segment in the group that can then be compared to the hash codes of all other segments in the group, or by providing a tree of bit-wise differences between elements of the group. If no data segment in that group in data repository 28 matches the data segment to be written, then the segment is written to, i.e., stored in that group in data repository 28 in accordance with block 98, described above. However, if a data segment in the corresponding group matches the data segment to be written, then reference counters may or may not need to be updated, depending upon the index at which the matching data segment was found.

If the collision tree is not already in memory 34 (FIG. 1), then it is retrieved or read from disk 20 or other source. Note that although reading the collision tree from memory consumes some processing overhead and thus slows the de-duplication and overall write process, in many instances the collision tree will already be in memory 34, and in other instances (e.g., blocks 98 and 100) the collision tree is not needed at all. Maintaining all or most of hash tree 70 in memory while only retrieving collision trees 72 from disks 20 or other persistent storage on an as-needed basis promotes efficiency. Also, in all but embodiments in which the desired data storage capacity is extremely large, the hash tree need not have more than three levels, along the lines of hash tree 70 shown in FIGS. 3 and 4. In such embodiments, at least the first and second levels of the hash tree can be maintained in memory at essentially all times, i.e., following initialization and through all subsequent read and write operations until the system is shut down or re-initialized. In some embodiments in which the hash tree has more than two levels, the third and subsequent levels can be retrieved into memory from persistent storage on an as-needed basis, while the first and second levels are maintained in memory.

The group identifier, the data segment to be written, or any other information needed by the collision tree for it to uniquely produce an index in the corresponding group are applied or input to the collision tree. If the matching data segment was found at an index that is the same index as that which the collision tree produced, then no further operations need be performed. That is, the data segment has been previously stored (presumably by the requesting host) in the same location to which it would otherwise be written. In such an instance the write operation is complete, and data storage system 10 can return an indication to the requesting host that write operation is complete. However, if the matching data segment was found at an index other than the ("new") index that the collision tree produced, then, while no data actually need be written at the new index, a corresponding reference counter for the new index is incremented to indicate an additional reference to the data segment stored at the other index, as indicated by block 104. As indicated by block 106, relocation table 42 is updated to reflect the new reference (following block 104) or the new group (following block 100). In an instance in which a new reference to an already-stored data segment was added to relocation table 42, the reference counter for the already-stored or "other" data segment is decremented, as indicated by block 108. Additional operations can be performed if a reference counter is decremented to zero, which would indicate that no host requires access to the data segment, such as reallocating the storage space in data repository 28 that had been allocated to that data segment. The above-referenced allocation manager can perform this and other functions relating to storage space allocation.

It should be noted that the invention has been described with reference to one or more exemplary embodiments for the purpose of demonstrating the principles and concepts of the invention. The invention is not limited to these embodiments. For example, although in the exemplary embodiment the data read and write requests originate with a host, and thus the data de-duplication occurs in an "in-line" manner on incoming data from a host, in other embodiments data read and write requests can originate with other elements, and data de-duplication can occur in a "post-processing" manner on data that already resides within a data storage system. As will be understood by persons skilled in the art, in view of the description provided herein, many variations may be made to the embodiments described herein and all such variations are within the scope of the invention.

What is claimed is:

1. A data de-duplication method for a data storage system, the data storage system having a data repository, the data repository storing data segments in a plurality of groups, the method comprising:

providing a data segment to be stored in the data storage system in association with a write request, the write request identifying a virtual volume address;

generating a group identifier in response to the data segment and a hash algorithm, each of a plurality of groups being identifiable by one of a corresponding plurality of group identifiers, each group comprising one or more indexes in the data repository, each index indicating a storage location for a data segment in the data repository;

determining if a corresponding group in the data repository exists comprises in response to the generated group identifier and a hash tree, each existing group corresponding to a leaf of the hash tree;

if no corresponding group is determined to exist in the data repository in response to the generated group identifier, storing the data segment in the data repository in a new group; and if a corresponding group is determined to exist in the data repository in response to the generated group identifier, storing the data segment in the data repository in response to a search of the corresponding group for a stored data segment matching the data segment to be stored.

2. The method claimed in claim 1, wherein storing the data segment in a new group comprises:

creating a new group in the data repository;

associating a collision indicating structure with a leaf of the hash tree, the associated collision indicating structure indicating an index in the data repository;

storing the data segment at a storage location in the data repository indicated by the index indicated by the associated collision indicating structure; and updating a relocation table to indicate a correspondence between the index in the data repository in which the data segment was stored and a logical address indicated by the write operation.

3. The method claimed in claim 1, wherein storing the data segment in response to a comparison of the data segment with stored data segments of the corresponding group comprises:

determining an index in the data repository in response to a collision indicating structure associated with a leaf of the hash tree corresponding to the generated group identifier;

determining whether the data segment to be stored matches a previously stored data segment in the corresponding group;

if the data segment matches a previously stored data segment at the determined index, providing an indication that the write operation is completed without further storing the data segment in the data repository;

if the data segment matches a previously stored data segment at an index other than the determined index, increasing a reference counter corresponding to the determined index, and decreasing a reference counter corresponding to the other index, and providing an indication that the write operation is completed without further storing the data segment in the data repository; and updating a relocation table to indicate a correspondence between the other index and a virtual volume address indicated by the write operation.

4. The method claimed in claim 3, wherein:

determining if a corresponding group in the data repository exists comprises accessing the hash tree in memory in response to the write request without first retrieving the hash tree from persistent storage in response to the write request; and determining an index in the data repository in response to a collision indicating structure comprises:

determining if the collision indicating structure exists in memory; and retrieving the collision indicating structure from persistent storage to memory if the collision indicating structure does not exist in memory.

5. The method claimed in claim 4, wherein:

the collision indicating structure comprises a collision tree having at least a first level and a second level; and retrieving the collision indicating structure from persistent storage comprises maintaining at least two levels of the collision tree in memory and only retrieving one or more additional levels beyond the first and second levels of the collision tree from persistent storage.

6. The method claimed in claim 1, further comprising:
determining an index in the data repository in response to a virtual volume address associated with a read request identifying the virtual volume address; and
retrieving a data segment at the determined index from the data repository.

7. The method claimed in claim 1, further comprising:
receiving an initialization indication;
including a zero-filled initialization segment at an initialization index in the data repository; and
in response to the initialization indication but before responding to a write request or read request, initializing the relocation table to indicate a correspondence between the initialization index and each virtual volume address.

8. The method claimed in claim 1, further comprising:
receiving an initialization indication; and
in response to the initialization indication but before responding to a write request or read request:
allocating no storage space in persistent storage for storing data segments in the data repository; and
allocating storage space in persistent storage for storing metadata representing one or more virtual volumes, each virtual volume representing space for storing data segments in the data repository.

9. The method claimed in claim 1, further comprising:
determining if a reference counter has a value of zero; and
if a reference counter has a value of zero, permitting a data segment at an index in the data repository corresponding to the reference counter to be overwritten.

10. A storage array system, comprising:
at least one persistent storage device; and
a processor system programmed or configured to:
provide a data segment to be stored in the data storage system in association with a write request, the write request identifying a virtual volume address;
generate a group identifier in response to the data segment and a hash algorithm, each of a plurality of groups being identifiable by one of a corresponding plurality of group identifiers, each group comprising one or more indexes in the data repository, each index indicating a storage location for a data segment in the data repository;
determine if a corresponding group in the data repository exists in response to the generated group identifier and a hash tree, each existing group corresponding to a leaf of the hash tree;
if no corresponding group is determined to exist in the data repository in response to the generated group identifier, store the data segment in the data repository in a new group; and
if a corresponding group is determined to exist in the data repository in response to the generated group identifier, store the data segment in the data repository in response to a search of the corresponding group for a stored data segment matching the data segment to be stored.

11. The storage array system claimed in claim 10, wherein the processor system is further programmed or configured to store the data segment in a new group by:
creating a new group in the data repository;
associating a collision indicating structure with a leaf of the hash tree, the associated collision indicating structure indicating an index in the data repository;
storing the data segment at a storage location in the data repository indicated by the index indicated by the associated collision indicating structure; and
updating a relocation table to indicate a correspondence between the index in the data repository in which the data segment was stored and a logical address indicated by the write operation.

12. The storage array system claimed in claim 10, wherein the processor system is further programmed or configured to store the data segment in response to a comparison of the data segment with stored data segments of the corresponding group by:
determining an index in the data repository in response to a collision indicating structure associated with a leaf of the hash tree corresponding to the generated group identifier;
determining whether the data segment to be stored matches a previously stored data segment in the corresponding group;
if the data segment matches a previously stored data segment at the determined index, providing an indication that the write operation is completed without further storing the data segment in the data repository;
if the data segment matches a previously stored data segment at an index other than the determined index, increasing a reference counter corresponding to the determined index, and decreasing a reference counter corresponding to the other index, and providing an indication that the write operation is completed without further storing the data segment in the data repository; and
updating a relocation table to indicate a correspondence between the other index and a virtual volume address indicated by the write operation.

13. A computer program product for data de-duplication in a data storage system, the computer program product comprising a computer-readable medium on which is stored in computer-readable form code that when executed on the storage array system causes the storage array system to:
provide a data segment to be stored in the data storage system in association with a write request, the write request identifying a virtual volume address;
generate a group identifier in response to the data segment and a hash algorithm, each of a plurality of groups being identifiable by one of a corresponding plurality of group identifiers, each group comprising one or more indexes in the data repository, each index indicating a storage location for a data segment in the data repository;
determine if a corresponding group in the data repository exists in response to the generated group identifier and a hash tree, each existing group corresponding to a leaf of the hash tree;
if no corresponding group is determined to exist in the data repository in response to the generated group identifier, store the data segment in the data repository in a new group; and
if a corresponding group is determined to exist in the data repository in response to the generated group identifier, store the data segment in the data repository in response to a search of the corresponding group for a stored data segment matching the data segment to be stored.

14. The computer program product claimed in claim 13, wherein code causing the storage array system to store the data segment in a new group causes the data storage array system to store the data segment by:
creating a new group in the data repository;

associating a collision indicating structure with a leaf of the hash tree, the associated collision indicating structure indicating an index in the data repository;

storing the data segment at a storage location in the data repository indicated by the index indicated by the associated collision indicating structure; and updating a relocation table to indicate a correspondence between the index in the data repository in which the data segment was stored and a logical address indicated by the write operation.

15. The computer program product claimed in claim 13, wherein the code causing the data storage system to store the data segment in response to a comparison of the data segment with stored data segments of the corresponding group causes the data storage system to store the data segment by:

determining an index in the data repository in response to a collision indicating structure associated with a leaf of the hash tree corresponding to the generated group identifier;

determining whether the data segment to be stored matches a previously stored data segment in the corresponding group;

if the data segment matches a previously stored data segment at the determined index, providing an indication that the write operation is completed without further storing the data segment in the data repository;

if the data segment matches a previously stored data segment at an index other than the determined index, increasing a reference counter corresponding to the determined index, and decreasing a reference counter corresponding to the other index, and providing an indication that the write operation is completed without further storing the data segment in the data repository; and updating a relocation table to indicate a correspondence between the other index and a virtual volume address indicated by the write operation.

* * * * *